United States Patent
Vallon et al.

(10) Patent No.: US 6,889,731 B2
(45) Date of Patent: May 10, 2005

(54) COMPRESSED-GAS CANISTER FOR A FASTENING APPLIANCE AND ADAPTER CAP FOR FITTING AN INTERMEDIATE SEAL

(75) Inventors: Emmanuel Vallon, Portes les Valence (FR); Frédéric Nayrac, Valence (FR); Patrick Herelier, Tournon (FR)

(73) Assignee: Societe de Prospection et d'Inventions Techniques Spit (FR)

(*) Notice: Subject to any disclaimer, the term of this patent is extended or adjusted under 35 U.S.C. 154(b) by 0 days.

(21) Appl. No.: 10/317,061

(22) Filed: Dec. 12, 2002

(65) Prior Publication Data

US 2003/0111136 A1 Jun. 19, 2003

(30) Foreign Application Priority Data

Dec. 18, 2001 (FR) .............................. 01 16367

(51) Int. Cl.[7] ................................................ B65B 1/04
(52) U.S. Cl. .................................... 141/351; 137/614.17
(58) Field of Search ............................. 141/20, 351–357, 141/360–375; 137/614.17, 614.04, 611.11

(56) References Cited

U.S. PATENT DOCUMENTS

| | | | |
|---|---|---|---|
| 4,949,745 A | * | 8/1990 | McKeon ................... 137/15.09 |
| 4,971,224 A | | 11/1990 | Scremin |
| 5,413,230 A | * | 5/1995 | Folter et al. .................... 215/5 |
| 6,138,714 A | | 10/2000 | Kim |
| 6,467,515 B1 | * | 10/2002 | Lin ............................. 141/351 |

FOREIGN PATENT DOCUMENTS

| | | |
|---|---|---|
| EP | 0 471 503 A | 2/1992 |
| EP | 0 922 902 A | 6/1999 |
| GB | 1152890 A | 5/1969 |

* cited by examiner

*Primary Examiner*—Steven O. Douglas
(74) *Attorney, Agent, or Firm*—Lowe Hauptman Gilman & Berner LLP

(57) ABSTRACT

Compressed gas canister (1') intended to supply gas to a fastening appliance (2) that runs on compressed gas, includes a protective edge (12) forming a bowl inside which an ejection valve (16) having a bearing and displacement surface (26) is mounted so that it can move in translation between a position of rest and a gas-ejection position. The ejection valve (16) is mounted, inside a seal (3'), set back from the edge (15) of the bowl. The bearing surface (26) of the valve (16) does not protrude beyond the edge (15) of the bowl in the position of rest and is set back from the surface (30) facing towards the outside of the seal (3', 23) in the gas-ejection position.

15 Claims, 4 Drawing Sheets

COMPRESSED-GAS CANISTER FOR A FASTENING APPLIANCE AND ADAPTER CAP FOR FITTING AN INTERMEDIATE SEAL

FIELD OF THE INVENTION

The invention relates first of all to a compressed-gas canister intended to supply gas to a fastening appliance that runs on compressed gas, that is to say an appliance for driving fasteners of the nail type, comprising an inlet device. The inlet device of the appliance is generally a solenoid.

BACKGROUND OF THE INVENTION

Known inlet devices, such as for example the one described in FR 2 771 796, comprise a male inlet end-piece, inside a bowl formed by a protective peripheral skirt. This inlet end-piece is intended to collaborate with an ejection valve of the canister to move the valve element away from its seat and thus allow gas to be transferred from the canister into the inlet device of the appliance. During the transfer operation, it is necessary to make a seal around the valve of the canister and the inlet end-piece of the appliance. For this purpose, the ejection valve of the canister is often, and particularly in the case of the canister described in FR 2 771 796, extended in the form of a male end-piece which collaborates with the inlet male end-piece of the appliance inside an appropriately designed connector.

Such an arrangement does, however, have the disadvantage that the end-piece of the ejection valve of the canister protrudes from the edge of a protective cup, with the risk of it being broken off while it is being handled, not to mention the problems associated with storage.

SUMMARY OF THE INVENTION

The present invention sets out to eliminate these drawbacks.

To this end, it relates to a compressed gas canister intended to supply gas to a fastening appliance that runs on compressed gas, comprising a protective edge forming a bowl inside which an ejection valve having a bearing and displacement surface is mounted so that it can move in translation between a position of rest and a gas-ejection position, characterized in that the ejection valve is mounted, inside a seal, set back from the edge of the bowl and the bearing surface of the valve does not protrude beyond the edge of the bowl in the position of rest and is set back from the surface facing towards the outside of the seal in the gas-ejection position.

In any case, the ejection valve of the canister of the invention no longer protrudes from the protective bowl.

In a first embodiment of the canister, the valve, in the position of rest, protrudes from the seal.

In this case, the bearing surface of the valve is intended to collaborate directly with a male end-piece of a gas inlet device of the appliance so as to push the valve back in the ejection position in which the seal stretches across each side of the plane where the valve and the male end-piece of the inlet device meet.

Advantageously, the seal comprises an external sleeve and an internal bead in an annular shoulder of a widened portion of the sleeve.

In a second embodiment of the canister, the bearing surface of the valve, in the position of rest, is set back from the surface facing towards the outside of the seal to accommodate a first male end portion of an intermediate seal, a second female end portion of which is intended to accommodate a male end-piece of a gas inlet device of the fastening appliance so as to push the valve back into the ejection position.

The invention also relates to the adapter cap for the second embodiment of the canister of the invention, designed to be housed in the protective bowl of the canister and to project therefrom, and in which is mounted the intermediate seal with a male end portion for collaborating with the ejection valve and female end portion for accommodating the male end-piece of the gas inlet device of the fastening appliance.

BRIEF DESCRIPTION OF THE DRAWINGS

The invention will be better understood from the description of two embodiments of the canister, with reference to the appended drawing, in which.

DETAILED DESCRIPTION OF THE INVENTION

Figure 2:
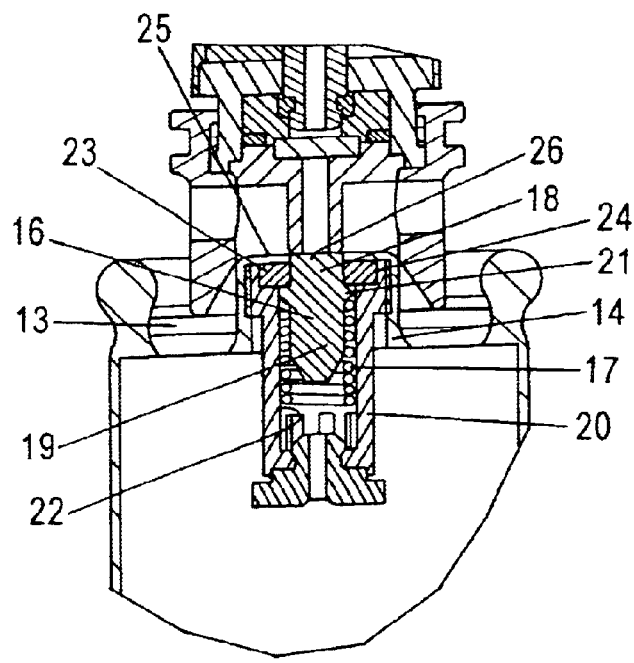
FIG. 2 is a sectional view of the canister and of the solenoid of FIG. 1 with the ejection valve and the inlet end-piece in contact with one another.
Figure 1:
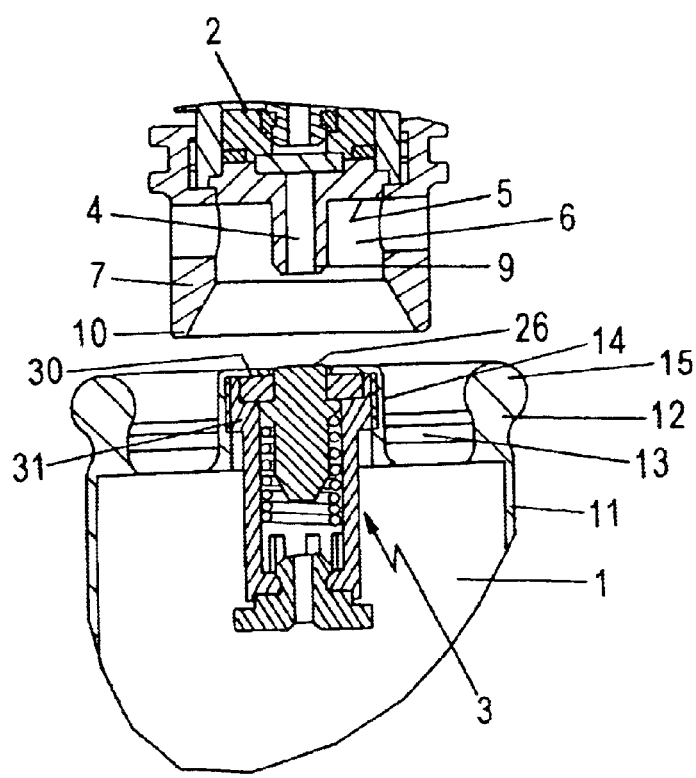
FIG. 1 is an exploded sectional view of the first embodiment of the compressed-gas canister of the invention and of a gas inlet solenoid of a fastening appliance that runs on compressed gas.
Figure 5:
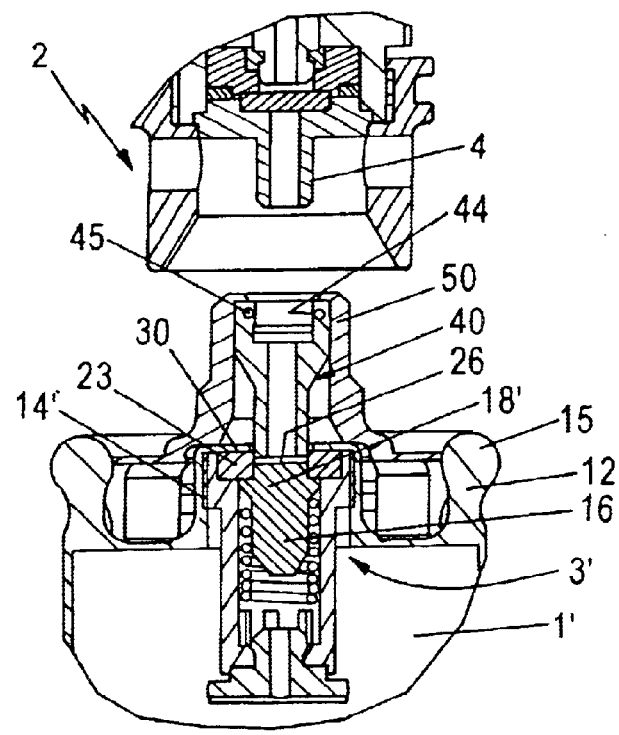
FIG. 5 is an exploded sectional view of the second embodiment of the compressed-gas canister of the invention, of a gas inlet solenoid of a fastening appliance that runs on compressed gas and of the adapter cap with its intermediate seal.
Figure 3:
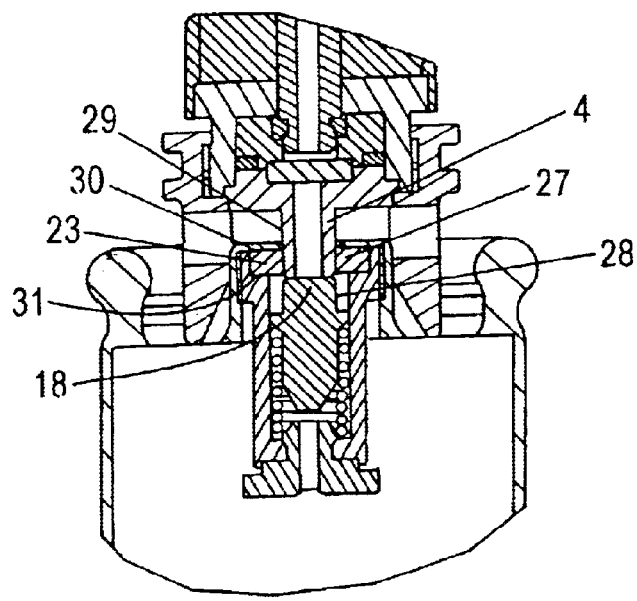
FIG. 3 is a view similar to that of FIG. 2, but in the state of transferring gas from the canister to the appliance.
Figure 4:
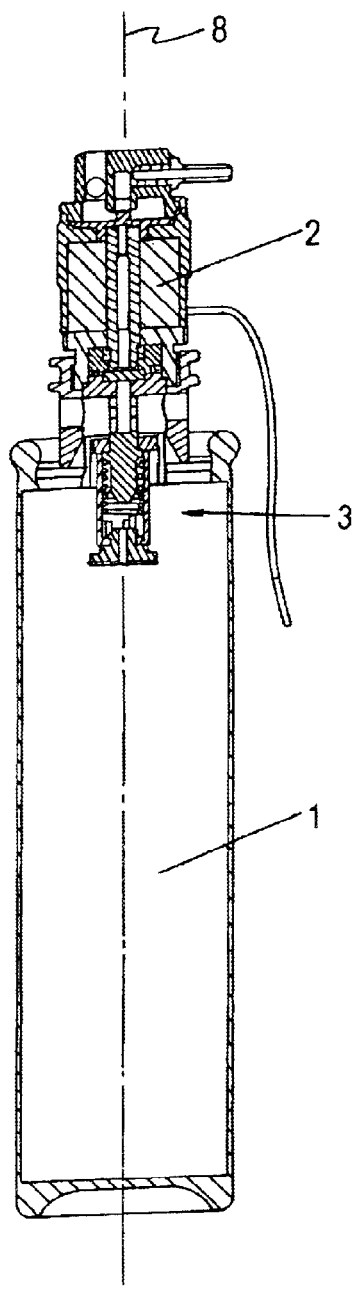
FIG. 4 is an overall view of the solenoid of FIG. 1, mounted on the canister.
Figure 8:
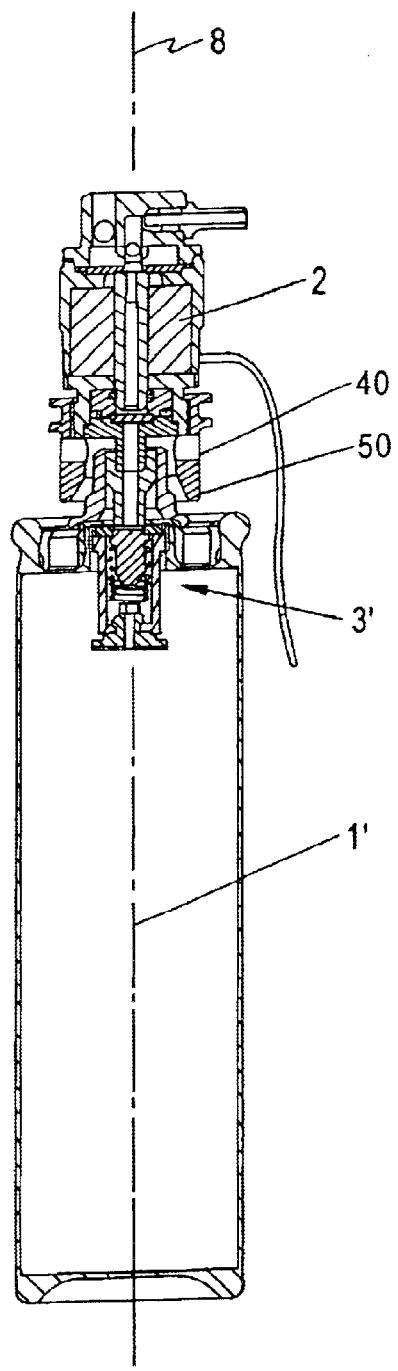
FIG. 8 is an overall view of the solenoid of FIG. 5 mounted on the canister.
Figure 7:
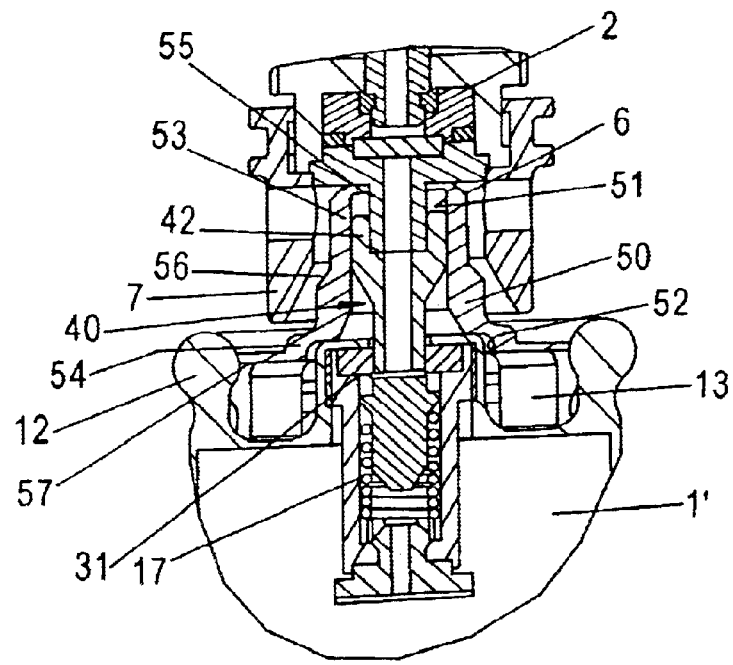
FIG. 7 is a view similar to that of FIG. 6, but in the state of transferring gas from the canister to the appliance.
Figure 6:
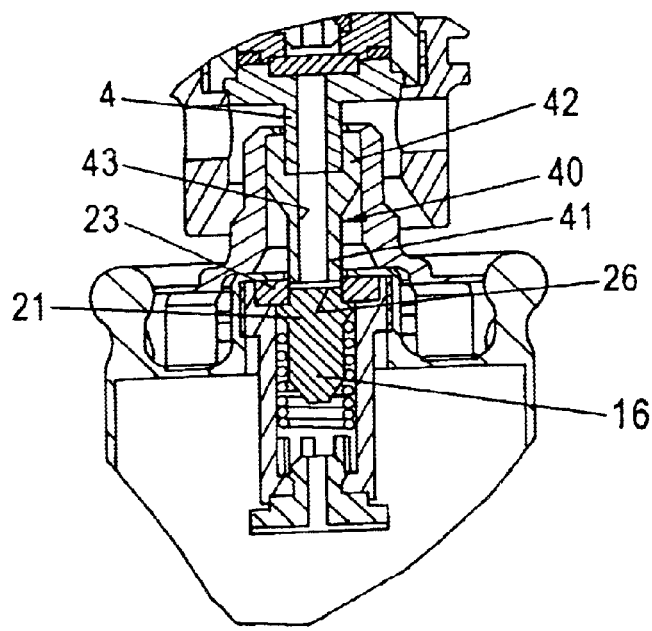
FIG. 6 is a sectional view of the canister and of the solenoid of FIG. 5 with the ejection valve and the intermediate seal in contact with one another.

With reference to FIG. 4, a compressed-gas canister 1 is mounted on the compressed-gas inlet solenoid 2 of an appliance for driving fasteners of the nail type, via a sealing connector 3.

The inlet solenoid 2 comprises a male inlet end-piece 4 extending axially—along the axis 8—projecting from the bottom 5 of a bowl 6, formed by an annular skirt 7 for accommodating an ejection base 14 of the canister 1. The end 9 of the inlet end-piece 4 of the solenoid is set back from the annular edge 10 of the skirt 7.

The compressed-gas canister 1 comprises a cylindrical casing 11 ending in a thick annular bulge 12 forming a bowl 13 from the centre of which the ejection base 14 projects. The base 14 does not project from the plane of the annular edge 15 of the bulge 12. In the example considered, it is flush therewith.

An ejection valve 16 is mounted in the ejection base 14, to slide in a seal 20 in the form of a sleeve against the action of a return spring 17. The valve 16 comprises an external part 18 projecting from the seal sleeve 20, but not from the bowl 13, extended by an internal part 19 comprising an annular sealing rim 21. The return spring 17 is housed inside the seal sleeve 20, around the internal part 19 of the valve 16, bearing against the annular sealing rim 21 of the valve part 19, of a diameter roughly equal to that of the central bore 22 of the sleeve 20 but nonetheless very slightly smaller so that compressed gas can escape between the wall of the bore 22 of the sleeve 20 and this rim 21. At rest, the rim 21 of the valve 16 bears against an annular sealing bead 23 housed in an annular shoulder of a widened portion 24 of the sealing sleeve 20 of the seal 3.

The seal 3 therefore comprises a sleeve 20 and a bead 23 which are housed in the base 14 an annular edge 25 of which covers the widened portion 24 of the sleeve and the sealing bead 23. The edge 25 of the base 14 here lies flush with the plane of the edge 15 of the bulge 12. The sealing sleeve 20 is thus set back slightly from the plane of the edge 15. The external valve part 18 has, facing outwards, a bearing and displacement surface 26 of the valve which, under all circumstances, does not protrude from the plane of the edge 15. In this instance, it is flush therewith. By contrast, in the position of rest of the valve 16, its external part 18, via its portion adjacent to the bearing surface 26, protrudes from the sealing bead 23.

It will be noted that the diameter of the external valve part 18 is roughly the same as, or very slightly smaller than, the diameter of the passage orifice 27 in the sealing bead 23 and the same as the outside diameter of the inlet end-piece 4.

In operation, the side wall 28 of the external valve part 18 and the outer side wall 29 of the inlet end-piece 4 are, successively, in contact with the wall of the passage orifice 27 in the sealing bead 23. They constitute cylindrical sealing surfaces of axis 8.

More specifically, and still in operation, the end 9 of the end-piece 4 comes to bear against the face 26 of the external valve part 18 arranged at right angles to the axis 8. By virtue of conventional means, not depicted, the external valve part 18, in operation, is pushed back into the ejection position by the inlet end-piece 4 against the action of the return spring 17, so as to disengage the rim of the annular valve 21 from the seal bead 23 and allow gas to escape from the canister 1 into the solenoid 2 of the fastening appliance. In this gas-ejection position, the bearing and displacement surface 26 of the valve 18, 19 is set back from the outwardly facing surface 30 of the seal bead 23, and even from its inwardly facing surface 31.

In the ejection position, the seal 3, with its sleeve 20 and its bead 23, extends across each side of the plane where the valve 18, 19 and the male inlet end-piece 4 meet, which is the plane of the bearing surface 26 of the external valve part 18.

The second embodiment 1' of the canister, depicted in FIGS. 5 to 8, here differs from the first in two features only:
- the ejection base 14' is markedly set back from the plane of the annular edge 15 of the bulge 12;
- the external valve part 18', with its bearing and displacement surface 26, in the position of rest, is set back from the plane of the outwardly facing surface 30 of the sealing bead 23 of the seal 3'.

With this canister, use is made of an intermediate seal 40 mounted in an adapter cap 50.

The intermediate seal 40 is a sleeve, with a first male end portion 41, mounted to bear against the bearing surface 26 of the valve 16 to actuate it and move its sealing rim 21 away from the sealing bead 23, and a second female end portion 42 intended to accommodate the male inlet end piece 4 of the solenoid 2. The outside diameter of the actuating end 41 corresponds to the diameter of the male inlet end-piece 4. The bore 43 for the passage of the compressed gas, passing through the intermediate seal 40, is stepped and its cross section, in the end portion 42, is appreciably larger than at the other end 41 to be a diameter equal to the outside diameter of the inlet end-piece 4. In consequence, the outside diameter of the end portion 42 is also widened with respect to that of the end portion 41. To improve sealing between the intermediate seal 40 and the inlet end-piece 4, the wall of the widened bore 44 in its end portion 42 has an annular sealing lip 45.

The adapter cap 50 has the shape of a ring with a stepped through-bore 51, 52 with a cross section (51) of a diameter roughly equal to the outside diameter of the widened female end portion 42 of the intermediate seal 40, in a male end portion 53 intended to be accommodated in the bowl 6 of the solenoid 2, and with a widened cross section (52) of a diameter roughly equal to the outside diameter of the ejection base 14', in a second female end portion 54 intended to accommodate this ejection base 14' of the canister 1'. The bore 51, 52 of the cap 50 extends over a length roughly equal to that of the intermediate seal 40. At its smaller cross section end 53, the cap 50 comprises an annular rim 55 for retaining the intermediate seal 40. The outer wall 56 of the cap 50 is also stepped, matched to the bore 51, 52 for accommodating the intermediate seal and to the skirt 7 of the solenoid 2 and ends, at its widened end 54, in an annular edge 57 of an outside diameter equal to the inside diameter of the bulge 12 of the canister 1' so that it can be accommodated in the bowl 13 of the canister 1'.

It is therefore only in the operating position that the intermediate seal 40 and the adapter cap 50 protrude from the bowl 13 of the canister 1'.

In operation, in order to push back the ejection valve 16 of the canister 1' from its position of rest (FIGS. 5, 6) to its ejection position (FIG. 7), the male end 41 of the intermediate seal 40, bearing against the surface 26 of the valve 16 by virtue of the adapter cap 50, immobilized in the bowl 13 of the canister 1', the intermediate seal 40, pushed back by the inlet end-piece 4, pushes the valve portion 18' back against the action of the spring 17 to disengage the annular valve rim 21 from the seal bead 23 and allow gas to escape from the canister 1' into the solenoid 2 of the fastening appliance. Thus, the intermediate seal is also disengaged from the rim 55 of the cap 50. In this gas-ejection position, the bearing and displacement surface 26 of the valve 18', 16 is set back from the inwardly facing surface 31 of the bead 23.

What is claimed is:

1. A compressed gas canister for supplying compressed gas to a fastening appliance that runs on compressed gas, said canister comprising:
   a protective edge forming a bowl;
   an ejection valve having a bearing and displacement surface, said valve being mounted inside said bowl so as to be moveable in translation between a position of rest and a gas-ejection position; and
   a seal having a surface facing towards the outside of the seal;
   wherein
   the ejection valve is mounted, inside the seal, set back from the edge of the bowl;
   the bearing surface of the valve does not protrude beyond the edge of the bowl in the position of rest, and is set back from the surface facing towards the outside of the seal in the gas-ejection position; and said protective edge is radially outwardly spaced from said gas seal so as to allow an end portion of a gas inlet device of the fastening appliance to be removably received within said bowl between the seal and the protective edge.

2. The canister according to claim 1, wherein said seal further having a surface facing towards the inside of the seal; and the ejection valve is set back from the surface facing towards the inside of the seal in the gas-ejection position.

3. The canister according to claim 2, wherein the bearing surface of the valve is adapted to collaborate directly with a male end-piece of a gas inlet device of the appliance so as to push the valve back in the gas-ejection position in which the seal stretches across each side of the plane where the valve and the male end-piece of the inlet device meet.

4. A compressed gas canister for supplying compressed gas to a fastening appliance that runs on compressed gas, said canister comprising:

a protective edge forming a bowl;

an ejection valve having a bearing and displacement surface, said valve being mounted inside said bowl so as to be moveable in translation between a position of rest and a gas-ejection position;

a seal having a surface facing towards the outside of the seal; and an intermediate seal having a first male end portion and a second female end portion;

wherein the ejection valve is mounted, inside the seal, set back from the edge of the bowl;

the bearing surface of the valve does not protrude beyond the edge of the bowl in the position of rest, and is set back from the surface facing towards the outside of the seal in the gas-ejection position;

the bearing surface of the valve, in the position of rest, is set back from the surface facing towards the outside of the seal to accommodate the first male end portion of said intermediate seal; and the second female end portion is adapted to accommodate a male end-piece of a gas inlet device of the fastening appliance so as to push the valve back into the gas ejection position.

5. A compressed gas canister for supplying compressed gas to a fastening appliance that runs on compressed gas, said canister comprising:

a protective edge forming a bowl;

an ejection valve having a bearing and displacement surface, said valve being mounted inside said bowl so as to be moveable in translation between a position of rest and a gas-ejection position; and a seal having a surface facing towards the outside of the seal;

wherein the ejection valve is mounted, inside the seal, set back from the edge of the bowl;

the bearing surface of the valve does not protrude beyond the edge of the bowl in the position of rest, and is set back from the surface facing towards the outside of the seal in the gas-ejection position; and the seal comprises an external sleeve and an internal bead in an annular shoulder of a widened portion of the sleeve;

said canister further comprising an ejection base having an annular edge, wherein the sleeve and the bead of the seal extend into said ejection base, and said annular edge of the ejection base covers the widened portion of the sleeve and the bead.

6. The canister according to claim 5, wherein said annular edge of the base lies flush with the plane of the edge of the bowl of the canister.

7. An adapter cap for a canister for supplying compressed gas to a fastening appliance that runs on compressed gas, said canister comprising a protective edge, an ejection valve and a seal, said protective edge forming a bowl, said ejection valve having a bearing and displacement surface, said valve being mounted inside said bowl so as to be moveable in translation between a position of rest and a gas-ejection position, said seal having a surface facing towards the outside of the seal, wherein the ejection valve is mounted inside the seal and set back from the edge of the bowl, and wherein the bearing surface of the valve does not protrude beyond the edge of the bowl in the position of rest and is set back from the surface facing towards the outside of the seal in the gas-ejection position;

said adapter cap being adapted to be housed in the bowl of the canister and to project therefrom, said adapter cap comprising an intermediate seal having a first male end portion for collaborating with the ejection valve, and a second female end portion for accommodating a male end-piece of a gas inlet device of the fastening appliance;

wherein the bearing surface of the valve, in the position of rest, is set back from the surface facing towards the outside of the seal to accommodate the first male end portion of said intermediate seal; and the second female end portion is adapted to accommodate the male end-piece of the gas inlet device of the fastening appliance so as to push the valve back into the gas-ejection position.

8. The adapter cap according to claim 7, further comprising a stepped outer wall defining a stepped through-bore;

said stepped outer wall having, at a first end thereof, an annular rim for retaining the intermediate seal, and at a second end thereof, an annular edge for accommodation in the bowl of the canister.

9. The canister according to claim 1, wherein the ejection valve, in the position of rest, protrudes from the seal.

10. The canister according to claim 1, wherein the seal comprises an external sleeve and an internal sealing bead in an annular shoulder of a widened portion of the sleeve.

11. The canister according to claim 10, wherein the valve comprises an annular sealing rim which, in the position of rest, bears against the bead, said annular sealing rim having a diameter which is very slightly smaller than the diameter of a central bore of the sleeve.

12. The canister according to claim 1, wherein the ejection valve, in the position of rest, does not protrude from the seal.

13. The canister according to claim 1, wherein said protective edge is an annular bulge.

14. The canister according to claim 1, wherein, in the position of rest, the bearing surface of the valve lies flush with the plane of the edge of the bowl of the canister.

15. The canister according to claim 10, wherein the bearing surface of the ejection valve, in the position of rest, is coelevational with the sealing bead.

* * * * *